United States Patent [19]

Grande et al.

[11] Patent Number: 5,568,450

[45] Date of Patent: Oct. 22, 1996

[54] SYSTEM AND PROCESSOR FOR REAL-TIME EXTRACTION OF OCEAN BOTTOM PROPERTIES

[75] Inventors: David W. Grande, North Stonington, Conn.; Michael T. Sundvik, Narragansett, R.I.; Judith L. Bishop, Waterford; Bernard F. Cole, New London, both of Conn.

[73] Assignee: The United States of America as represented by the Secretary of the Navy, Washington, D.C.

[21] Appl. No.: 330,143

[22] Filed: Oct. 18, 1994

[51] Int. Cl.$^6$ .......................... H04B 11/00; G01S 15/00
[52] U.S. Cl. .................................. 367/131; 367/88
[58] Field of Search .................... 367/87, 131, 88; 364/421

[56] References Cited

U.S. PATENT DOCUMENTS

| | | | |
|---|---|---|---|
| 3,555,499 | 1/1971 | MacDonald et al. | 367/87 |
| 4,796,238 | 1/1989 | Bourgeois et al. | 367/87 |
| 5,126,978 | 6/1992 | Chaum | 367/131 |

Primary Examiner—Ian J. Lobo
Attorney, Agent, or Firm—Michael J. McGowan; William F. Eipert; Prithvi C. Lall

[57] ABSTRACT

A system for characterizing ocean bottom properties in real-time by exploiting the multipath structure of reverberation to extract values for the bottom loss and the bottom scattering coefficient. The system obtains environmental and navigational data and synchronizes the data with sonar state data and acoustic beam data to produce an input data stream to an extraction processor. The extraction processor utilizes a digital signal processing means to produce a reverberation energy envelope from the acoustic beam data and time correlate the reverberation energy envelope with the environmental, navigational, and sonar state data. A general purpose computer monitors the reverberation envelope and the environmental, navigational, and sonar state data for change and instructs a modeling processor to construct a new eigenray propagation model and a new reference reverberation model if any changes occur in the data that results in a change to the previously constructed eigenray propagation or reference reverberation models. A pair of local extraction processors perform the extraction of the bottom loss and the bottom scattering coefficient by performing a probe pulse extraction algorithm and a reverberation decay algorithm, respectively.

8 Claims, 5 Drawing Sheets

SYSTEM AND PROCESSOR FOR REAL-TIME EXTRACTION OF OCEAN BOTTOM PROPERTIES

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED PATENT APPLICATION

This patent application is co-pending with a related patent application Ser. No. 08/330142 entitled METHOD FOR REAL-TIME EXTRACTION OF OCEAN BOTTOM PROPERTIES, Navy Case No. 76410, by co-inventors Judith Bishop, Michael T. Sundvik and David W. Grande.

BACKGROUND OF THE INVENTION

1. Field of the Invention

The present invention relates to a system for extracting ocean bottom properties in real-time. More particularly, the invention relates to a processor and system for the extraction of the bottom loss and the bottom scattering strength coefficient in real-time.

2. Description of the Prior Art

In bottom limited environments, sonar signals must bounce off the bottom and the surface several times in order to increase the detection range and the performance of the sonar system. As is known in the art, sonar performance and detection range are often estimated or predicted by computing active signal excess. Active signal excess, by definition, is the received signal to noise ratio divided by the signal to noise ratio required for detection, for a given probability of false alarm and detection. The results of the active signal excess calculations are used to select the optimum mode for the sonar system including best current mode, pulse length, and range scale settings. However, to accurately predict the range at which a return signal can be detected as well as sonar performance, one must be able to accurately predict the amount of attenuation of the sonar signal due to the absorption of sound by the bottom as well as the reflection of sound by the bottom. Over estimating or under estimating the amount of bottom loss or bottom scattering greatly affects the calculation of active signal excess. Thus, to optimize the active signal excess performance prediction in bottom limited environments, it is necessary to accurately predict the bottom loss and the bottom scattering coefficient. Additionally, accurately determining the bottom loss and the bottom scattering coefficient enables one to distinguish and differentiate between bottom types.

Current techniques for determining values for bottom loss and the bottom scattering coefficient suffer from one or more disadvantages or defects which limit their application for many uses. For example, one technique for determining the bottom loss relies on estimates of bottom loss and the bottom scattering coefficient obtained by surveying the areas of the bottom, obtaining bottom samples (sediment cores) or obtaining extensive I sonar data, and accurately measuring values for bottom loss and bottom scattering using the sediment cores or the extensive sonar data. However, such techniques require that large areas of the bottom be surveyed in advance, often requiring a large amount of time and personnel, and cannot be performed in situ or in real-time. Additionally, in many shallow bottom limited areas, currents, biologics or human activities can change the thickness and make-up of the bottom materially affecting the bottom loss.

Other devices, such as that described in U.S. Pat. No. 3,555,499, determine a single value for attenuation due to the ocean bottom by comparing magnitude of transmitted sonar signals with the magnitude of the returns. However, such devices do not generate independent values for the bottom loss and the bottom scattering coefficient, nor do such devices compute bottom attenuation as a function of grazing angle. Additionally, the device of U.S. Pat. No. 3,555,499 does not consider environmental parameters which may affect depth and absorption measurements such as the sound speed profile. Currently, there is no device available to determine values for the bottom loss and the bottom scattering coefficient in real-time. Such a device would be a welcome addition to the art.

SUMMARY OF THE INVENTION

Accordingly, it is a general purpose and object of the present invention to provide a processor and system for the I extraction of ocean bottom properties.

Another object of the present invention is the provision of a processor and system to extract values for bottom loss and bottom scattering coefficient in real-time.

A further object of the present invention is the provision of a processor and system to extract values for bottom loss and bottom scattering coefficient in real-time by processing measured reverberation and time correlated sonar, navigational, and environmental data.

Yet a further object of the present invention is the provision of a ship-mounted processor and system for characterizing ocean bottom properties in real-time using time correlated sonar, navigational, and environmental data.

These and other objects of the present invention are accomplished by providing a system and processor for the extraction of ocean bottom properties in real-time wherein the system obtains environmental and navigational data from a series of sensors and synchronizes the data with sonar state data. Acoustic beam data from a sonar array is merged with the environmental, navigational, and sonar state data to produce a data stream for input to an extraction processor. The extraction processor utilizes a digital signal processor to produce a reverberation energy envelope from the acoustic beam data and time correlate the reverberation energy envelope with the environmental, navigational, and sonar state data. A general purpose computer is preprogrammed to coordinate and manage the data transfer to and from the digital signal processor, to monitor the reverberation envelope and the environmental, navigational, and sonar state data for change and to instruct a modeling processor to construct an eigenray propagation model and a reference reverberation model if any changes occur in the data that results in a change the eigenray propagation model or the reference reverberation model. A pair of local extraction processors perform the real-time extraction of bottom loss and the bottom scattering coefficient by performing a probe pulse extraction algorithm and a reverberation decay algorithm, respectively.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein.

DESCRIPTION OF THE PREFERRED EMBODIMENT

Figure 1:
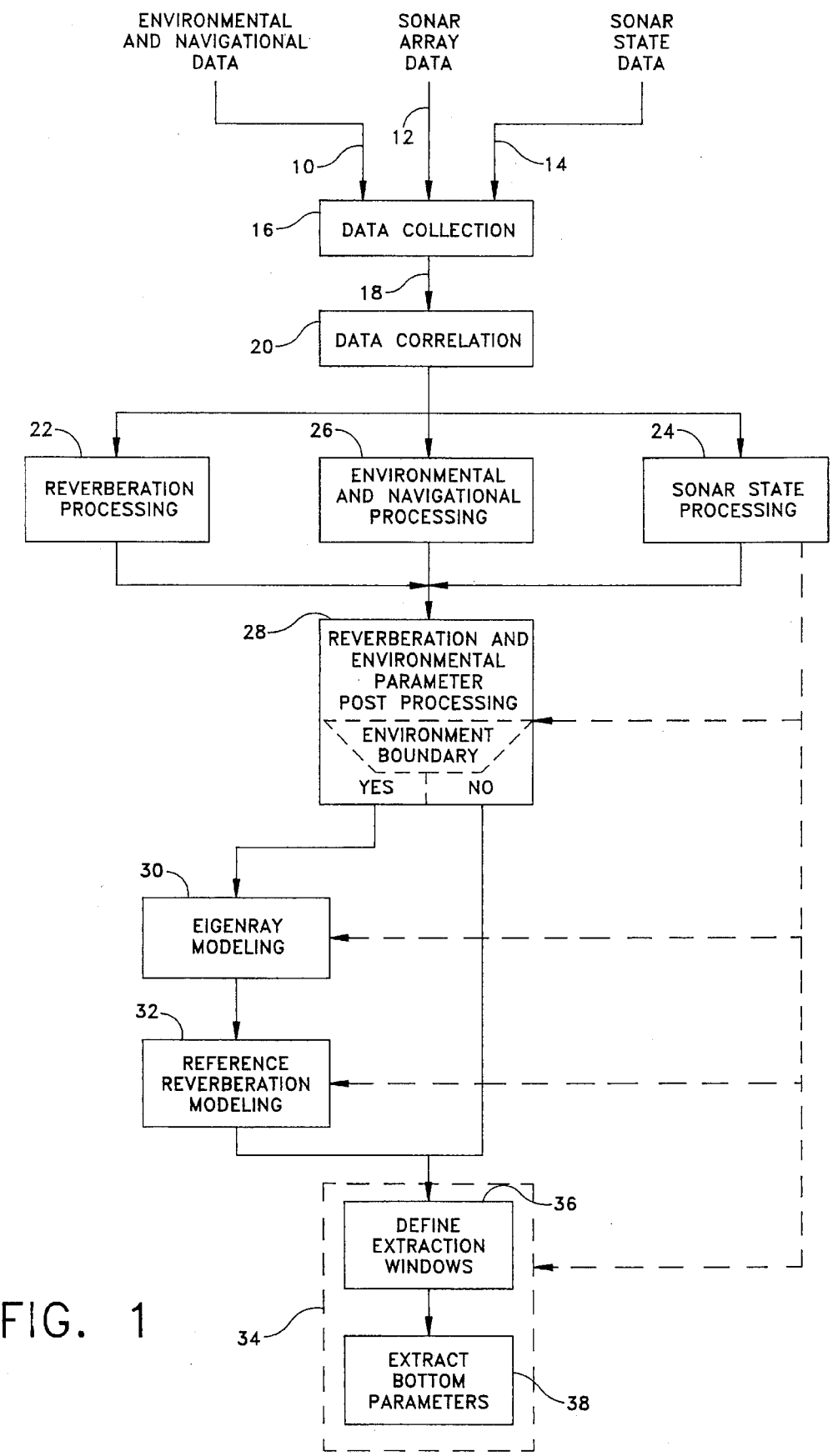
FIG. 1 shows a block diagram of a method for thee real-time characterization of ocean bottom properties.

Referring now to FIG. 1, there is shown a block diagram outlining the steps of a method for characterizing ocean bottom properties in real-time in accordance with the present invention. A navigational system and various environmental sensors (not shown) provide input 10 to data collection task 16. Input 10 provides information such as ship position coordinates, ship heading, ship speed, relative wind direction and velocity, and water temperature and depth data. A sonar system (not shown) provides sonar array signal 12 corresponding to a measured acoustic signal as well as sonar state data 14 containing such information as depression elevation angle, frequency, pulse length and repetition rate.

In data collection task 16, measured and estimated data from the navigational system, environmental sensors and the sonar system is monitored. Data collection task 16 polls the data, performs any necessary data conversion, and generates input data stream 18. Typically, data stream 18 will be a single data stream comprising sampled navigational, environmental and sonar data multiplexed with acoustic signal data. Preferably, data collection is performed at continuous periodic rates based upon the expected rate of change of the data and upon the consistency and accuracy of instantaneous data samples. Reasonable periodic rates are once every second for navigational, environmental and sonar state data sampling. The measured acoustic signal should be sampled at a rate in excess of the Nyquist frequency to ensure that an accurate digital representation of the acoustic signal is obtained.

Data correlation task 20 groups the data collected in task 16 by type and time correlates the data. Data correlation task 20 receives and demultiplexes input data stream 18, grouping the data as either acoustic signal data (time series sequence of multibit digital numbers representing the acoustic signal) or system/sensor data. The system/sensor data can be further grouped into raw data blocks containing navigational system, environmental sensor or sonar state data. Data correlation task 20 time correlates the data such that the system/sensor data samples and the acoustic signal data samples can be tracked and related to one another over a common time domain.

Reverberation processing task 22 receives acoustic signal data and sonar state data from data correlation task 20. Reverberation processing task 22 processes the time domain digital beam data into a reverberation energy envelope in the frequency band of interest. Each ping from the sonar system produces an acoustic return which can be processed into a single reverberation energy envelope. The raw digital signal data is processed into a reverberation envelope using standard energy envelope processing techniques. The waveform data such as raw digital signal data from an acoustic return from a sonar ping is basebanded and filtered. The filtered waveform data undergoes own doppler nullification (ODN) processing to remove the frequency shift in the waveform resulting from the ship's motion. Fast Fourier transform processing is used to obtain the frequency domain function of the waveform from which the reverberation energy envelope is then computed. In computing a reverberation energy envelope for use in extraction of bottom parameters, the time step between data points on the reverberation energy curve is preferably equal to the pulse length. That is, if the pulse length is 10 ms, the time step between data points in the reverberation envelope is 10 ms (an output rate of 100 samples/sec).

Sonar state parameter processing task 24 processes the raw sonar state data into valid system state data for use by other processing steps. The raw sonar state data relates information regarding the configuration, condition, and status of the sonar system. Task 24 monitors the raw sonar state data and converts the data into valid system state data such as source angle, source heading, pulse length, frequency, transmitter beam pattern and receiver beam pattern. To reduce the amount of processing performed in computing the transmitter and receiver beam patterns, task 24 precomputes a set of transmitter and receiver beam patterns. These beam patterns are precomputed, based on the full phases and element locations of the sonar, for a set of steering directions such as 0, 10, 20 and 30 degrees down. A pre-integration of the beam patterns in azimuth is performed to reduce the full three dimensional beam patterns to an equivalent two-dimensional pattern (beam function vs. vertical angle) which gives the full fidelity of three dimensional beam pattern in the model, but allows for a significant improvement in reverberation calculation time required for real-time extraction.

Task 24 also monitors the sonar system state parameters to determine whether the current sonar system configuration is a valid configuration for the parameter extraction method to be used and to ascertain whether any sonar state parameter has changed. If task 24 determines that the current configuration is not a valid configuration or that, although the configuration is valid, one or more sonar state parameters have changed, task 24 notifies reverberation and environmental parameter post processing task 28, eigenray modeling task 30, reference reverberation modeling task 32, and bottom parameter characterization task 34 of the sonar system state change.

Environmental and navigational parameter processing task 26 uses the raw environmental and navigational data collected in task 16 to compute valid environment parameters such as sound speed profile, corrected bottom depth, true wind speed and true source bearing.

A sound speed profile is generated by calculating the speed of sound as a function of depth. The speed of sound can be calculated if the temperature, pressure and salinity of the water are known by using these values in one of several well known formulas such as the Del Grosso, Kuwahara, Medwin, or Wilson equations. The Del Grosso empirical sound speed relation is given in Del Grosso, *New Equation for the Speed of Sound in Natural Waters*, J. Acoust. Soc. of Amer., vol. 56, no. 4, 1974, pp. 1084–1091, incorporated herein by reference.

Values for temperature, pressure and salinity as a function of depth can be measured or estimated using a combination of an expendable bathythermogram (XBT) and a velocity meter or similar devices. A drop of an XBT can provide values for temperature and pressure as a function of depth. A towed device such as a velocity meter containing temperature and pressure sensors can obtain measurements of temperature, pressure, and sound velocity, at a single point in the water column. The depth of the velocity meter can be determined from the pressure measurements. The salinity can then be determined by solving one of the above sound speed equations such as the Del Grosso sound speed equation for salinity using the temperature, pressure and sound velocity measurements.

Utilizing a known sound speed equation such as the Del Grosso relation, task 26 generate the sound speed profile by calculating the speed of sound at each point in the water column from the surface to the bottom. The sound speed profile can be accurately approximated by calculating the speed of sound at each layer in a set of contiguous layers from the surface to the bottom if the width of the layers is made sufficiently narrow. A reasonable width for such layers is one meter. The sound speed profile is generated using data from a recent XBT drop and one or more values of salinity determined by a towed device. When calculating the sound speed profile using a series of layers, the raw XBT data can be smoothed to remove or average data points arising from duplicate XBT readings within a single layer. As water depths increase and the latest sound speed profile no longer reaches the bottom, and until the next XBT is available, the profile can be extended to the new bottom depth by simple extrapolation of the deepest available sound speed to the present bottom depth. Since the bottom parameter extraction process is designed for shallow water, no provision has been made to merge measured profiles with a database of deep sound speed profiles.

The corrected bottom depth (true depth) can be determined by measuring the nominal, uncorrected depth by using a fathometer or the like and converting the uncorrected depth to true depth by integrating over the sound speed profile to convert travel time to corrected depth from the fathometer to the ocean bottom. True depth from the surface to the bottom can then be obtained by including the depth of the fathometer transducer.

Several factors including noise, a poorly-reflective bottom, or ship motion can introduce errors into the fathometer readings and affect the accuracy of the readings. To compensate for such outliers in the fathometer readings, the true depth is calculated periodically, and after a statistically significant number of depth values have been calculated, the median value is ascertained, using the most recent values, after each calculation of true depth. That is, after a new value of true depth is calculated, the new value is added to the list of values and the oldest value is dropped from the list. A new median value of this updated list is then determined. It is anticipated that the depth can be accurately assessed by calculating the true depth every second and determining the median value using the sixty most recent depth calculations.

True wind speed is required to estimate when the sea surface loss is significant enough to have an effect on reverberation decay in the shallow water environment. The true wind speed is determined from a combination of the ship's course and speed information in combination with relative wind speed and direction measurements. The relative wind speed and direction can be obtained by using a commercially available weather station, an interface to the ship's anemometers, or the like. The relative wind speed and direction are averaged over a short period of time, such as one-minute. An appropriate vector sum of the averaged relative wind and ship's motion (bearing and speed) determines true wind speed. The ship's bearing and speed can be determined from Global Positioning System (GPS) satellites. The GPS satellites provide the ship with accurate navigational data and exact position coordinates. The difference between two GPS coordinate readings can be used to accurately determine the ship's true course and speed.

Reverberation and environmental parameter post processing task 28 attempts to detect environmental and acoustic boundaries by correlating characteristic changes in the reverberation energy envelope with the environmental parameters calculated in task 26, as well as by monitoring the environmental parameters for change. Determining environmental and acoustic propagation boundaries aids in maintaining and computing valid sets of acoustic model eigenrays and a valid reference reverberation model needed to perform bottom parameter extraction processing.

Both eigenray and reference reverberation modeling are processor intensive operations taking a long time to complete relative to the other processing tasks. Reducing the amount of time used to generate the eigenray and reference reverberation models increases the amount of time available to perform extraction processing. One way to reduce the amount of time required to complete eigenray and reference reverberation modeling is to reduce the number of times that these models are built. To perform bottom parameter extraction using measured reverberation returns, the eigenray and reference reverberation models only need to be rebuilt when there is a change in the environment having a large enough effect on the acoustic propagation to affect the reverberation returns. Detecting these environmental and acoustic boundaries which effect reverberation returns and building the eigenray and reverberation models only when such boundaries are identified, minimizes the number of times that the eigenray and reverberation models will be built.

To detect characteristic changes in the reverberation energy envelope, task 28 statistically analyzes and compares a "current" reverberation envelope to a "baseline" (reference) reverberation envelope. To obtain the baseline reverberation energy, task 28 computes an average reverberation envelope from a given number of reverberation envelopes in a specified beam. This baseline average reverberation envelope can be computed using a single envelope (single ping) as computed in reverberation processing task 22 or using several envelopes. Typically, several envelopes are used in computing the baseline average reverberation envelope to remove fine differences, such as those arising from minor variations in the environment or from random or bias errors attributable to the sonar system, leaving only major differences which can be associated with environmental boundaries. In selecting the number of envelopes to average, consideration should be given to the pulse length, the repetition rate, and the area sonified along with the requirement that the reverberation envelopes be taken from returns over substantially the same ocean bottom area. A reasonable number of envelopes to average is 6.

After the baseline reverberation envelope is acquired, new average reverberation envelopes are calculated as the ship travels through the water. The most recently acquired average reverberation envelope is labelled the current reverberation envelope and is used in statistical analysis and comparison with the baseline reverberation envelope. The number of envelopes averaged is determined using the same considerations as outlined above for calculating the baseline reverberation envelope. Preferably, the same number of envelopes used to create the baseline average are used to create the new average reverberation envelope.

Characteristic changes in the reverberation energy envelope are identified using several common statistical analysis methods. Task 28 compares the baseline reverberation average to the current reverberation average using the overall mean difference as a function of time and a chi squared analysis. Both analyses are performed over the entire reverberation average. Task 28 also divides both the current and baseline average into several segments and performs mean difference and chi squared analyses on these individual segments. Task 28 can also compare the current to the baseline reverberation average by identifying changes in the variance, in the onset of reverberation or in the duration of reverberation. As is obvious to one skilled in the art, other analysis methods can be substituted for or performed in addition to the chi squared and mean difference analyses.

If any one of the above analyses identifies variations between the two averages, post processing task 28 correlates the navigational, environmental, and sonar parameters with the statistical data in an attempt to identify an environmental boundary. Task 28 first identifies the portions of the current and baseline reverberation averages exhibiting changes, and, using this information, task 28 identifies the time period over which these portions were obtained. Knowing the time periods enables task 28 to obtain the values of the environmental parameters during those periods. Task 28 compares the obtained values of the environmental parameters with the values provided by task 26 to determine whether the changes in reverberation are due to changes in the environmental parameters.

Task 28 also monitors the environmental parameters computed in task 26 to determine if a new eigenray computational model and a new reference reverberation model need to be computed. When the environmental parameters previously used in eigenray modeling task 30 and reference reverberation modeling task 32 differ from recently acquired parameters by a certain percentage, typically 15–20%, task 28 indicates that an environmental boundary has been identified. When a boundary is identified by comparing recent environmental parameters, task 28 can notify an operator who is given the option to override the identification of an environmental boundary. To aid the operator in assessing the changes in environmental parameters, both a time history of the most recent measurement points and the current values are available for display.

When an environmental boundary is identified, either by direct comparison of environmental parameters or by statistical analysis method, task 28 notifies eigenray modeling task 30. Task 28 then acquires a new baseline reverberation average for use in statistical analysis.

Task 28 operates as just described as long as the sonar system state configuration remains constant. If, however, the sonar state configuration has changed, sonar state processing task 24 will notify task 28 of the sonar state change. Upon notification of any sonar state parameter change that results in a reverberation energy envelope change, task 28 suspends and stores the current processing line-up. Task 28 then establishes a "new" baseline reverberation average for the current sonar state configuration and begins processing "new" current averages for statistical analysis. If sonar state processing task 24 then notifies task 28 of a sonar state change that returns the sonar configuration to a previous system state, task 28 suspends and stores the "new" processing line-up and recalls and continues processing the previous processing line-up. Tracking sonar system state changes and corresponding processing line-ups is done to ensure that changes detected by statistical comparison of the current and baseline averages are solely due to propagation environment changes and not a result of changes in the sonar state configuration.

Eigenray modeling task 30 uses the environmental parameters generated in environmental and navigational parameter processing task 26 to create sets of acoustic model eigenrays. A set of acoustic model eigenrays is defined to be a set of rays that join a sound source to a given target and predict the underwater acoustic propagation between the two points. Generating eigenrays is per se well known, and essentially requires solving the reduced wave equation using one of several ray-based acoustic wave-evaluation models such as the multipath expansion eigenray model, the FACT eigenray model, the RAYMODE eigenray model, or the like. More details on eigenray modeling are given in Weinberg, *Application of Ray Theory to Acoustic Propagation in Horizontally Stratified Oceans*, J. Acoust. Soc. of Amer., vol. 58, no. 1, 1975, pp. 97–109, incorporated herein by reference, and Weinberg, *Effective Range Derivative for Acoustic Propagation Loss in a Horizontally Stratified Ocean*, J. Acoust. Soc. of Amer., vol. 70, no. 6, 1981, pp. 1736–1742, incorporated herein by reference.

Sets of acoustic model eigenrays from the source to several points (targets) on the bottom at various ranges from the source are generated. Preferably, all the targets are in line with the source, separated by a predetermined range interval, and extend to an outside range equal to the range over which reverberation is expected to be observed. The outside range can be estimated from the raw reverberation return or approximated by considering the sound speed profile, depth, and sonar state parameters. The range interval is chosen to be as large as possible while meeting the requirement that the range be small enough to obtain sufficient resolution of the grazing angle, preferably resolution of $\pm 1°$. This ensures that enough sets of eigenrays will be produced to enable accurate reference reverberation modeling and parameter extraction without generating an excessive number of eigenrays.

In generating the acoustic model eigenrays, the bottom reflection coefficient is set to near unity, and the surface reflection loss is set to unity. These settings are used to provide a reference set having many eigenrays sufficient for use in the extraction processes. Additionally, setting the bottom reflection coefficient to near unity and the surface reflection loss to unity allows for comparison between calculated and measured reverberation levels.

The eigenray amplitudes, source angles, receive angles (at the bottom), travel times, number of bottom or surface reflections or vertices, and phase are extracted from the eigenrays generated and are made available for use by reference reverberation modeling task 32 and for use by bottom parameter characterization task 34.

Eigenray modeling is initiated when task 30 is notified of a change in environmental parameters by reverberation and environmental parameter post processing task 28 or of a change in the sonar state configuration by sonar state processing task 24. When eigenray modeling is initiated as a result of environmental parameter changes, task 30 builds new eigenray models using the current environmental and sonar state parameters. However, when task 30 is initiated as a result of sonar state configuration changes, task 30 first stores the current eigenray sets and then either builds a new eigenray model or recalls a previously stored eigenray model. Stored eigenray models are recalled if a sonar state change returns the sonar configuration to a previous system state and no environmental boundary has been detected since the eigenray model had been stored.

Reference reverberation modeling task 32 determines reverberation as a function of time using the results from eigenray modeling task 30, environmental parameter processing task 26, and sonar state parameter processing task 24. Computing reference reverberation as a function of time is well known in the art and essentially involves computing an individual reverberation value and total travel time for every round trip path available between the source and each target and then adding together the individual reverberation values for all acoustic paths intercepting the bottom whose total travel time falls within each specific time frame within a series of such time frames. Preferably, each time frame is chosen to have a duration approximately equal to ½ the pulse length.

The individual reverberation values for each round trip path can be generated in a known manner such as by calculating a transmitted ray scattering strength value for the eigenray from the source to the target, calculating a scattering strength value for the received eigenray, and multiplying these two values together. The transmitted eigenray scattering strength for an individual eigenray can be calculated using the following equation:

$$TRNS_{STR} = B_{STR} * (SCRLVL * AMP_{EIG} * BMP_{TRN})^2$$

where $TRNS_{STR}$ is the transmitted eigenray scattering strength; $B_{STR}$ is the bottom scattering strength; SCRLVL is the source level; $AMP_{EIG}$ is the eigenray amplitude; and $BMP_{TRN}$ is the transmitter beam pattern (pressure ratio) for the relative bearing and source angle. The receive eigenray scattering strength for an individual eigenray can be calculated using the following equation:

$$RCV_{STR} = B_{STR} * (AMP_{EIG} * BMP_{RCV})^2$$

where $RCV_{STR}$ is the received eigenray scattering strength; and $BMP_{RCV}$ is the receiver beam pattern (voltage ratio) at the relative bearing and source angle.

Preferably, the transmitted eigenray scattering strength and the receive eigenray scattering strength are calculated using either a unity bottom scattering strength or a Lambert's Rule scattering strength function with the coefficient set equal to unity to simplify the extraction of the bottom scattering strength coefficient and bottom loss.

Bottom parameter characterization task 34 can be performed using either the probe pulse extraction method or the reverberation decay extraction method. Typically, for the probe pulse extraction method, the sonar is set to transmit a short pulse in a specific depression angle. A short pulse length is chosen to reduce problems with the number of independent interfering amplitudes from multiple scatterers and multiple paths which combine to form the returns. The duration of the pulse should be short enough to enable sufficient resolution of the grazing angle, yet be long enough to enable one to accurately measure the returns. Preferably, the sonar is set to transmit a continuous wave pulse with a duration in the range of 10 to 20 milliseconds. The system is set to transmit the pulse at a depression angle, preferably between 10 and 30 degrees down. The depression angles are chosen giving consideration to the beam width such that there is an overlap of the area sonified between two consecutive depression angles. For a beam width of 15°, specific depression angles of 10, 20 and 30 degrees down can be chosen. Although any depression angle within the preferred range can be used, selecting specific depression angles reduces the number of transmitter and receiver beam patterns which need to be computed.

For the reverberation decay extraction method, the sonar system is typically set to transmit a continuous wave pulse having a duration in the range of 450 to 550 ms. Preferably, the sonar system is aimed in substantially horizontal direction (approximately 0° down).

For both methods, bottom parameter characterization task 34 includes two general steps: defining extraction windows task 36 and extracting bottom parameters task 38. Defining extraction windows task 36 uses the reference reverberation calculated in task 32 and the measured reverberation energy envelope as computed in task 22 or, alternatively, the current reverberation average as computed in reverberation and environmental parameter post processing task 28 to identify a period of time, the extraction window, in which a reverberation energy envelope exhibits properties which allows the extraction method to derive bottom parameters. Extracting bottom parameters task 38 performs either the probe pulse or reverberation decay extraction algorithm, based on the type of extraction window identified, to derive values for the bottom scattering coefficient and bottom loss.

The probe pulse method for bottom parameter extraction determines bottom scattering strength coefficient and bottom reflection loss versus grazing angle from single, identifiable acoustic paths, if those paths exist. More specifically, defining extraction windows task 36 of the probe pulse method identifies time periods (extraction windows) wherein the reverberation results solely or substantially from the direct (0 surface bounces, 0 bottom bounces) path eigenrays or from the single surface, single bottom bounce (1,1) path eigenrays. Extracting bottom parameters task 38 derives the bottom scattering coefficient using time periods resulting from or dominated by a (0,0) path. Bottom loss is computed from the time periods resulting from or dominated by a (1,1) path.

To identify the time periods wherein the reverberation results solely from or is dominated by contributions from the direct (0,0) or single surface bounce, single bottom bounce (1,1) eigenrays, defining extraction windows task 36 computes round trip travel time and individual reverberation values for each 0,0 path and 1,1 path eigenray. The individual reverberation values should be calculated using the same method and parameters used by task 32 to calculate the reference reverberation.

Task 36 then subtracts each individual reverberation value from the reference reverberation time frame in which the round trip travel time of that individual reverberation value falls. The extraction windows are identified as the time frames for which the subtraction result equals zero. As previously discussed, the reference reverberation is typically computed by adding together all individual reverberation values whose round trip travel time falls within a specified time frame. Thus, for time frames wherein an individual reverberation value equals the reference reverberation (subtract to zero), the reverberation for that time frame (extraction window) results substantially from that single, identifiable eigenray path.

Bottom parameter extraction task 38 extracts a bottom scattering strength coefficient using the extraction windows, if any exist, wherein the reverberation results from or is dominated by the 0,0 paths (bottom scattering time periods). The bottom scattering strength coefficient is determined by subtracting measured reverberation (dBs) from the reference reverberation (dBs) within each of the bottom scattering time periods (0,0 extraction windows) identified in task 36. This difference directly yields the scattering strength coefficient as a function of that extraction window, which can be converted to bottom scattering strength coefficient as a function of grazing angle by determining the grazing angle for that window. The grazing angle for the extraction window is equal to the receive angle of the eigenray associated with that extraction window. The eigenray receive angle is calculated in eigenray modeling task 30 described above. The results of the scattering strength determination vs. grazing angle can be displayed for review. Additionally, several different sonar depression angle results may be accumulated to extend the grazing angle range.

Having determined the bottom scattering coefficient as a function of grazing angle, extracting bottom parameters task 38 can derive the bottom loss as a function of grazing angle if any extraction windows exist in which the reverberation results solely or substantially from the single surface, single bottom bounce (1,1) path eigenrays. If an extraction window associated with a 1,1 path is identified (bottom loss time window), a predicted reverberation level is calculated for that bottom loss time period. This predicted reverberation level is calculated using the scattering strength coefficient vs. grazing angle results previously computed by task 38. Preferably, the bottom scattering coefficient was calculated from the same reverberation envelope from which bottom loss is being extracted. A direct subtraction of measured reverberation from predicted reverberation yields twice the single interaction bottom reflection loss vs. two way travel time. Travel time is converted to grazing angle by comparison to the travel time versus grazing angle relationship determined for the eigenray associated with that extraction window derived in eigenray modeling task 30.

The reverberation decay extraction method determines the bottom scattering strength coefficient and a single value for bottom loss based on reverberation decay in shallow water environments where the acoustic propagation is governed by multiple interactions with the sea surface and ocean bottom. This method is predicated on the assumptions that bottom loss is the dominant boundary loss mechanism and that a limited range of grazing angles at the bottom dominate the acoustic paths. Thus, a constant bottom reflection loss will be adequate to describe the propagation. The reverberation decay method is particularly well suited for extracting bottom loss under low wind speed and downward refracting conditions. The method is especially applicable to the extraction of bottom parameters from hull mounted sonar systems aimed in horizontal directions in shallow water.

Figure 2:
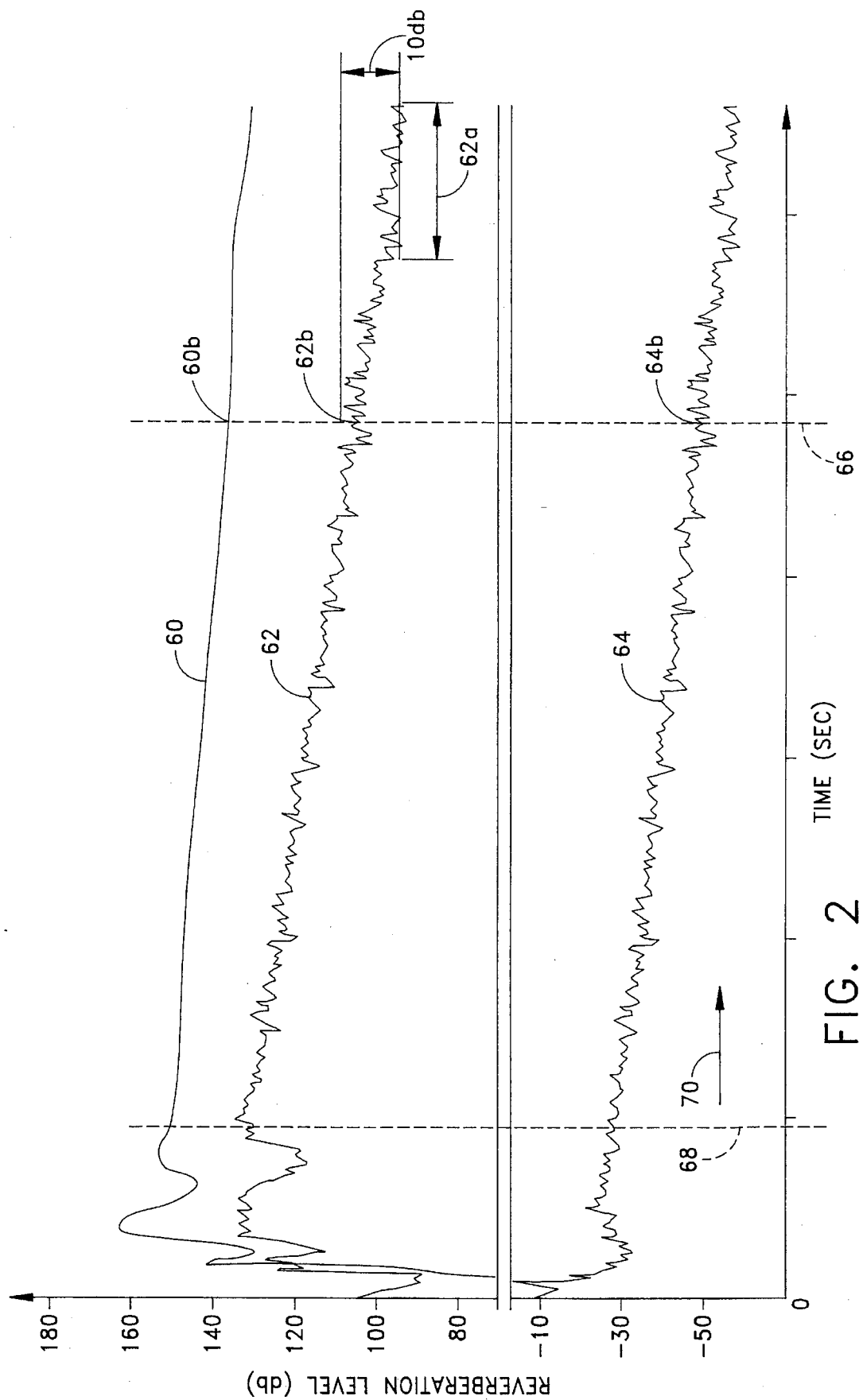
FIG. 2 shows three sample reverberation time histories (reverberation level, in dBs, as a function of time) computed by the method of FIG.

Defining extraction windows task 36 and extracting bottom parameters task 38 of the reverberation decay method for parameter extraction are explained with reference to FIG. 2 in which three sample reverberation time histories (reverberation level, in dBs, as a function of time) are shown. Time history 60 represents the time history for the reference reverberation envelope computed in reference reverberation modeling task 32, and time history 62 represents the time history for the measured reverberation energy envelope computed in task 22 or, alternatively, the current reverberation average computed in task 28. Time history 64 is a reduced reverberation time history computed by subtracting reference reverberation time history 60 from the measured reverberation time history 62.

Defining extraction window task 36 for the reverberation decay method isolates a time window (period of time) wherein the reverberation exhibits a characteristic decay rate. The extraction window is determined by analyzing the portion of time history 64 corresponding to reverberation. The portion of reduced reverberation time history 64 corresponding to reverberation is isolated by separating reverberation time history 62, which is directly related to time history 64, into a portion corresponding to noise and a portion corresponding to reverberation. To separate reverberation from noise in time history 62, the noise level on reverberation time history 62 must be determined.

The noise level is identified as the portion of time history 62 from the end of the time history for which a constant average reverberation level is exhibited. The region of time history 62 labeled 62A is representative of the portion of the time history for which a constant average reverberation level, taken to be the noise level, is exhibited. Reverberation is separated from the noise level by identifying the last time for which the reverberation level is greater than 10 dB above the noise level. That is, starting from the end of time history 62, the history is traced back in time (moving to left in FIG. 2) until the reverberation level first reaches a level that is 10 dB higher than the noise level. Point 62B identifies the last point in the time history 62 where the reverberation level is 10 dB greater than the noise level, and point 64B indicates the corresponding point in time on the reduced reverberation time history 64. The portion of the reduced reverberation time history corresponding to reverberation is from point 64B back in time (to the left in FIG. 2) along time history 64.

Having identified the portion of the reduced reverberation time history corresponding to reverberation, the extraction window can be determined. The window is identified by using a standard linear least squares analysis or similar linear curve fitting analysis over a series of extraction windows on time history 64, starting with a wide extraction window and narrowing the window until the linear least squares fit from successive windows show little change in slope or regression coefficient. Because the method is designed for shallow water environments where the propagation is governed by multiple interactions with the surface and bottom, the extraction window should coincide with that portion of reduced reverberation time history 64 corresponding to multiple surface and bottom interactions.

Preferably, the extraction window is determined by fixing a first edge (dotted line 66) of the window at a point on history 64 (preferably at the end of the time history near point 64B) and a second edge (dotted line 68) at a second point on the time history (preferably at a point shortly after the initial surface and bottom scattering are received). A linear least squares fit to the portion of time history 64 bounded by edges 66 and 68 is calculated. The window is narrowed, preferably by sliding second edge 68 in the direction of arrow 70, a linear least squares fit for the new window is calculated, and the least squares fit for the two most recent windows are compared. This process continues until the linear least squares fit from two successive windows show no significant change (preferably, less than a 2% change) in slope or regression coefficient. The last window defined in this process becomes the extraction window.

Extracting bottom parameters task 38 of the reverberation decay method focuses solely on the time period isolated by the extraction window to determine a scattering strength coefficient and bottom loss. The scattering strength coefficient is obtained from the intercept of the least squares fit to time history 64 for the extraction window and the reverberation axis using the following equation:

Intercept=$10 \log \mu$ where $\mu$ is the bottom scattering coefficient.

Bottom loss is derived by successively changing the value of bottom loss, using a binary search or similar technique, and recalculating the reference reverberation model over the time period defined by the extraction window for each new value of bottom loss until the slope of the recalculated reference reverberation closely matches the slope of the least squares fit to time history 64. To speed the real-time process, previously derived values of bottom loss are used as a starting point for the binary search, under the assumption that bottom loss should not be a rapidly changing function of position.

Extracting bottom parameters task 38 determines the dominant grazing angle at the bottom for which the bottom loss applies by averaging the grazing angles of the eigenrays intercepting the bottom, weighted by their amplitude, for all eigenray pairs whose round trip travel time nearly equals the time at the center of the extraction window.

The values of bottom scattering coefficient and bottom loss thus derived can then be entered back into the model to calculate a total reference reverberation time history for comparison to the measured reverberation. This allows an operator to see the amount of beam reverberation which is adequately modeled under the assumptions implicit in the method, and make an assessment of the range for which the results can be used reliably in predicting propagation in the shallow water environment.

Figure 3:
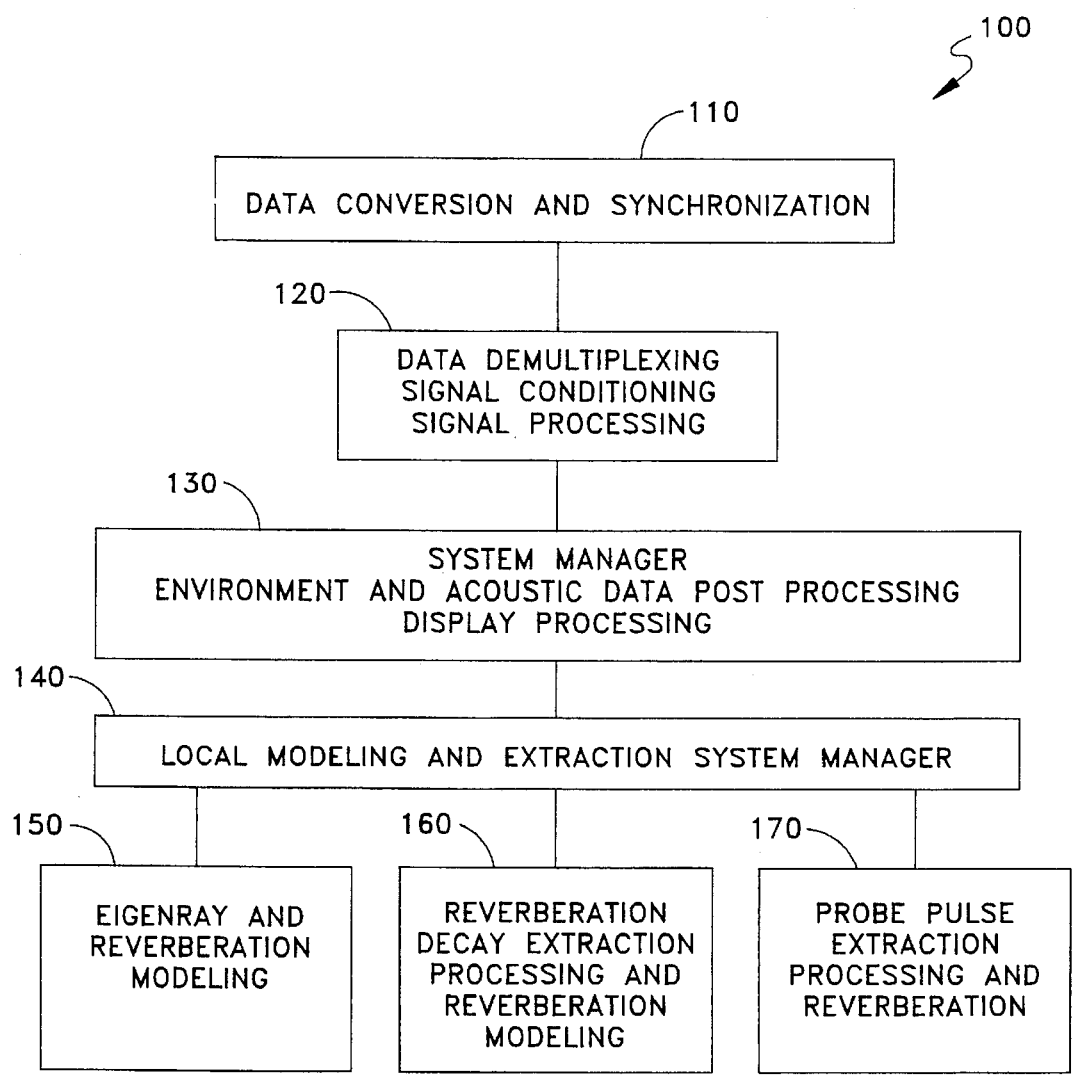
FIG. 3 is a block diagram of the functional units of a preferred embodiment of a processor for real-time extraction of ocean properties in accordance with the present invention.

Referring now to FIG. 3, there is shown a block diagram illustrating the functional units of a preferred embodiment of parameter extraction processor 100 for the real-time extraction of ocean properties in accordance with the present invention. Data conversion and synchronization unit 110 accepts sonar, navigational, and environmental sensor data from a data acquisition system (not shown). Data conversion and synchronization unit 110 performs data stream synchronization by sampling continuous serial data, converting the serial data to byte wide parallel data, and transmitting the data to data demultiplexing, signal conditioning and signal processing unit 120.

Data demultiplexing, signal conditioning and signal processing unit 120 accepts data from unit 110. The data is demultiplexed and the raw time domain samples of the acoustic signal are separated from the environmental, navigational, and sonar state data. Processing unit 120 processes the raw time domain samples of the acoustic signal into a reverberation energy envelope in the frequency band of interest which is then sent to system manager unit 130. The remaining raw data blocks from the environmental, navigational, and sonar state sensors are grouped by type and also passed to system manager unit 130.

System manager unit 130 is the primary control unit responsible for all environmental, navigational, and sonar data processing. Unit 130 controls the data demultiplexing, signal conditioning and processing, and data transfer tasks associated with data demultiplexing, signal conditioning and signal processing unit 120. System manager unit 130 processes the raw data blocks containing navigational, environmental and sonar state data into valid system state messages and conditioned environmental data for use by other units. System manager unit 130 also performs environmental and reverberation post processing on the acoustic signal and environmental data, wherein the reverberation envelopes are analyzed in an attempt to detect environmental and acoustic propagation boundaries.

System manager unit 130 also performs system coordination by monitoring the results of the boundary detection processing as well as the sonar system state data. System manager unit 130 uses the results of the boundary detection processing and the sonar state data to determine the functional flow and operation of the processor. Functional flow decisions such as when to build eigenray models or which extraction method to perform are passed as commands to local modeling and extraction system manager unit 140.

In addition, system manager unit 130 provides a user interface which allows a user to view system state messages, conditioned data, and processing results. Based on this information, the user can modify or override function flow decisions.

Local modeling and extraction system manager unit 140 functions as the primary information manager and task manager for eigenray and reverberation modeling unit 150, reverberation decay extraction processing and reverberation modeling unit 160, and probe pulse extraction processing and reverberation modeling unit 170. In response to commands (functional flow decisions), conditioned data, and system state messages received from unit 130, local modeling and extraction system manager unit 140 provides data to and concurrently controls and coordinates the processing flow across modeling and extraction units 150–170.

Unit 150 performs eigenray modeling. Unit 160 performs reverberation decay extraction processing. Unit 170 performs probe pulse extraction processing. Units 150, 160, and 170 compute reference reverberation models concurrently. Together, modeling and extraction units 150–170 perform all high speed, high fidelity eigenray and reverberation modeling, as well as, execution of ocean bottom property extraction algorithms between modeled information and real-time acoustic reverberation data. The results from modeling and extraction units 150–170 are returned to system manager unit 130, via local modeling and extraction system manager unit 140, for display.

Figure 4:
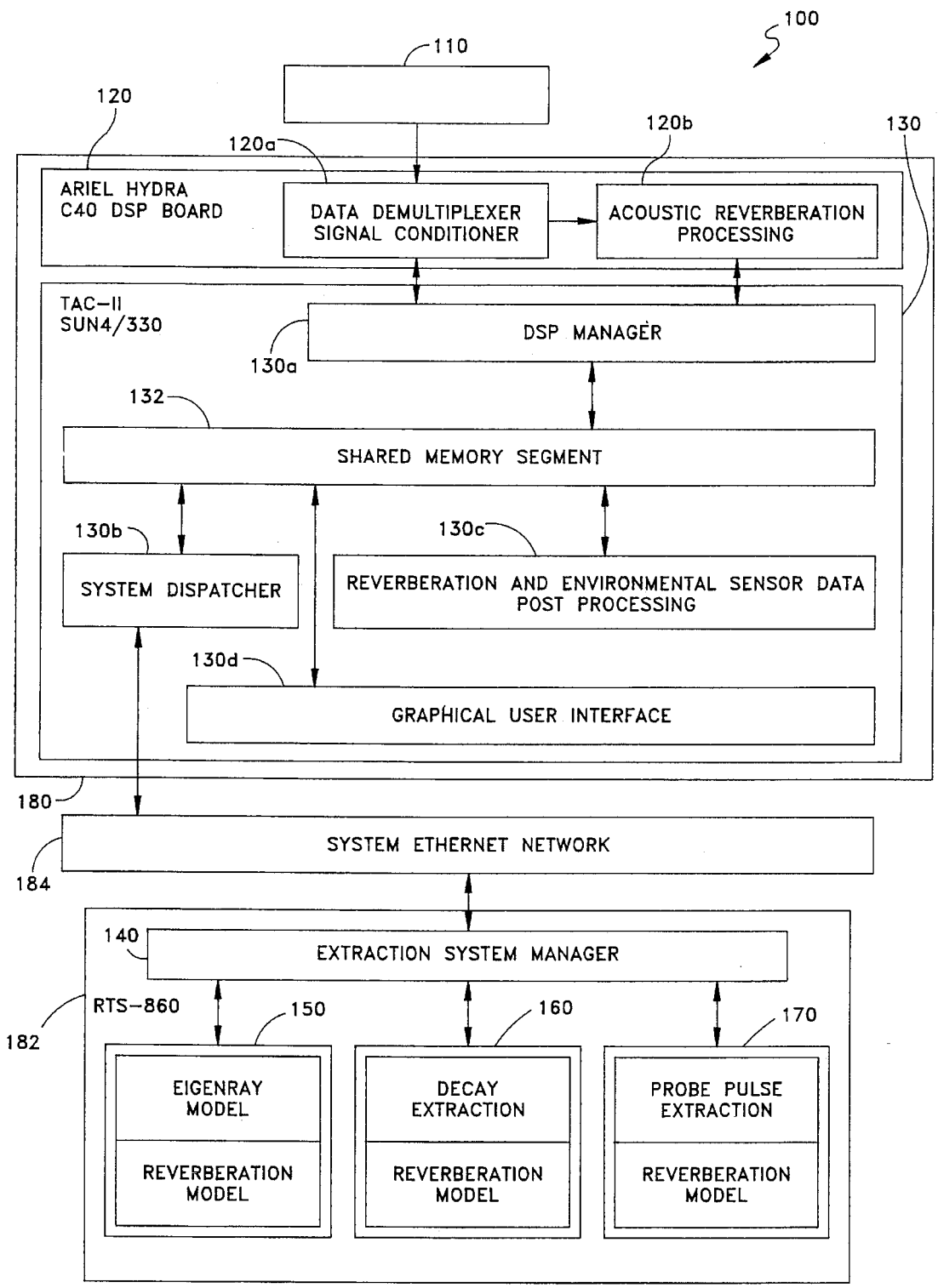
FIG. 4 is a schematic diagram showing the hardware elements, system enclosures and data paths, along with the functions performed by each, of a processor for real-time extraction of ocean properties in accordance with the present invention.

Referring now to FIG. 4, there is shown a schematic diagram of the hardware elements, system enclosures and data paths, along with the functions each performs, for parameter extraction processor 100 in accordance with the present invention. In FIG. 4, a hardware element having the same reference number as a functional unit of FIG. 3 is used to perform that function as described in reference to FIG. 3. The processor shown in FIG. 4 provides a platform on which the tasks of FIG. 1 are executed to monitor acoustic propagation environments and to model reverberation and extract boundary parameters from real-time sonar reverberation. The operation of extraction processor 100 will be explained with additional reference to FIG. 1.

Data conversion and synchronization unit 110 is provided to synchronize and convert data for transfer between a data acquisition system (not shown) and digital signal processor board 120. An interface board converts continuous serial data, running at approximately 11.2 Mbits per second, to byte wide parallel data. The data is formatted as required for input to data demultiplexing, signal conditioning and signal processing unit 120. The data is buffered and burst transmitted to unit 120.

Unit 120 can be an Ariel V-C40 Hydra digital signal processing board or the like provided to perform the data demultiplexing and signal conditioning functions of data correlation task 20 and the reverberation processing function of reverberation processing task 22, through digital signal processors 120a and 120b, respectively. Unit 120 comprises a byte-wide parallel communications port (not shown), digital signal processors 120a and 120b (such as two TMS320C40 DSPs or the like), and a global bank of dynamic random access memory (not shown).

Unit 120 accepts data from unit 110 via the byte-wide parallel communications port. Signal processor 120a demultiplexes the real-time data stream and groups the data in two forms: acoustic beam data and raw data blocks containing navigational, environmental, and sonar system state data. Signal processor 120a also time correlates the data such that the system/sensor data samples and the acoustic signal data samples can be tracked and related to one another over a common time domain.

The sonar acoustic beam data is processed into reverberation energy envelopes, as described in reference to reverberation processing task 22 of FIG. 1, by signal processor 120b. The reverberation energy envelopes, along with the raw data blocks, are passed to the global bank of dynamic random access memory (not shown), a common block of shared memory that is available to both signal processors 120a and 120b and accessible by system manager unit 130.

Unit 130 can be a general purpose computer and is the primary workstation or similar device for general purpose computer system 180 such as a Navy standard TAC-II computer system (SUN4/330) or the like. Unit 130 comprises a digital signal processor (DSP) manager 130a, a system dispatcher 130b, a reverberation and environmental sensor data post processor 130c, and a graphical user interface 130d. Units 120 and 130 are both running in a single VME enclosure on general purpose computer system 80.

Unit 130 is configured to access unit 120 through a standard transmission channel such as a VME bus (not shown). DSP manager 130a controls the data demultiplexing and time correlation performed by signal processor 120a, as well as the reverberation processing performed by signal processor 120b. DSP manager 130a also controls the data transfer from unit 120. DSP manager 130a receives the reverberation energy envelopes and the raw data blocks of environmental, navigational, and sonar state data from unit 120 and passes both the reverberation envelopes and the raw data blocks into shared memory segment 132.

System dispatcher 130b processes the raw data blocks placed in shared memory segment 132 by DSP manager 130a into valid sonar system state and environmental sensor data performing the operations of sonar state parameter processing task 24 and environmental and navigational parameter processing task 26 of FIG. 1. System dispatcher 130b passes the valid sonar state and environmental data to shared memory 132 for access by reverberation processor 130a and user interface 130d. System dispatcher 130b also monitors the sonar state data and the results reverberation processor 130a and user interface 130d, discussed below, to determine the overall functional flow and operation of processor 100 of FIG. 4

Reverberation and environmental sensor data post processor 130c attempts to detect environmental and acoustic boundaries by correlating characteristic changes in the reverberation energy envelope with environmental parameters, as well as by monitoring the environmental parameters for change by performing the functions of reverberation and environment parameter post processing task 28 of FIG. 1. Graphical user interface 130d provides interactive display processing which allows an operator to view valid sonar state messages, conditioned data, and processing results and to provide system input such as an input to modify or override processing options.

Local modeling and extraction system manager 140 can be a Motorola MVME167-68040 or the like. Extraction system manager 140 performs provides data to and concurrently controls and coordinates the data flow and the processing flow across modeling and extraction units 150–170. Modeling and extraction units 150–170 are commercially available processor boards such as CSPI supercards (SC-2XL(I860)) or the like. Together extraction system manager 140 and the processor boards of units 150–170 combine to configure a commercially available CSPI RTS-860 system (modeling processor 182).

The processor board of unit 150 performs the eigenray modeling function described in task 30 of FIG. 1. and generates a first reverberation model. The processor board of unit 160 determines the bottom scattering strength coefficient and a single value for bottom loss performing both the defining extraction windows task 36 and the extracting bottom parameters task 38 of the reverberation decay method for bottom parameter characterization. Further, the unit 160 processor board generates a second reverberation model. The processor board of unit 170 determines the bottom scattering strength coefficient and the bottom loss versus grazing angle using the steps outlined in defining extraction windows task 36 and extracting bottom parameters task 38 of the probe pulse method for bottom parameter characterization. The unit 170 processor board also generates a third reverberation model. Modeling processor 182 uses the reverberation models generated by units 150–170 to produce reference reverberation as a function of time performing the steps described in reference reverberation modeling task 32. Typically, reference reverberation as a function of time is generated concurrently by units 150–170 wherein each unit generates a different portion of the reference reverberation function. For example, the reference reverberation can be divided into three equal time segments such that, if the reference reverberation function extends over 12 seconds, each of the processor boards in modeling processor 182 builds a separate four second segment of the reference reverberation function.

Environmental and sonar state data, reverberation energy envelopes, processing instructions, and processing results are transferred between general purpose computer system 180 and modeling processor 182 via a TCP/IP or similar connection through transmission means 184 such as an ethernet network or the like.

Figure 5:
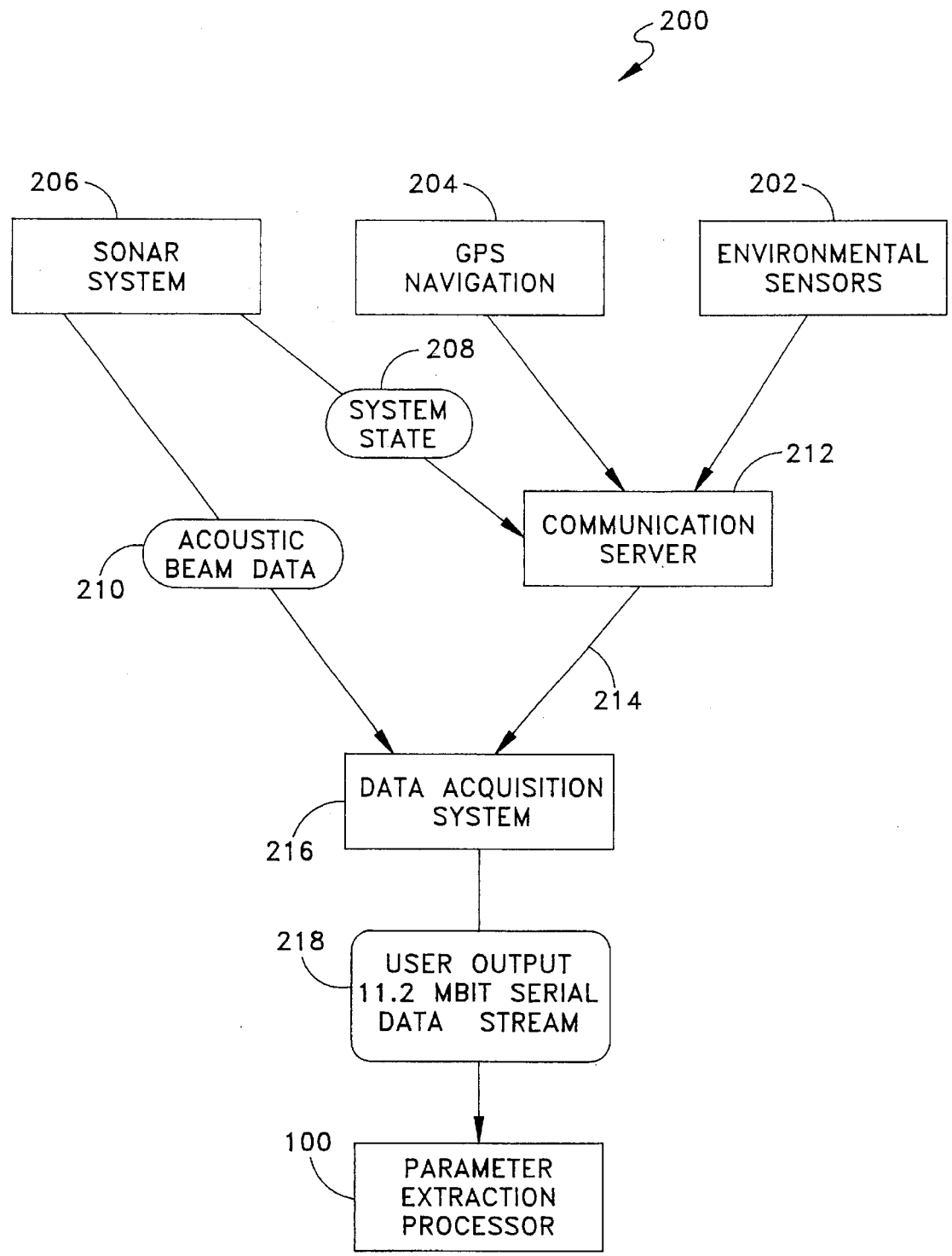
FIG. 5 is a block diagram of a system for the extraction of ocean bottom properties in real-time in accordance with the present invention.

Referring now to FIG. 5, there is shown a block diagram of system 200 for the extraction of ocean bottom properties in real-time in accordance with the present invention. In FIG. 5, environmental sensors 202 provide information such as relative wind direction and velocity (from an anemometer or similar weather station) and water temperature and depth data (from an XBT or similar device) and sound speed measurements (from a velocity meter or similar device). Navigation system 204 such as a GPS system or the like provides information such as ship position coordinates, ship heading, and ship speed. Sonar system 206 provides sonar system state data 208 and acoustic beam data 210. Sonar system state data 208 and data from navigation system 204 and environmental sensors 202 are monitored by communication server 212. Communication server 212 continuously monitors and collects the environmental, navigational, and sonar system state data and generates data stream 214. Preferably, data stream 214 comprises environmental, navigational, and sonar state data sampled at continuous periodic rates based upon the expected rate of change of the data and upon the consistency and accuracy of instantaneous data samples. Reasonable periodic rates are once every second for navigational, environmental and sonar state data sampling.

Data acquisition system 216 receives data stream 214 from communication server 212 and acoustic beam data 210 from sonar system 208 and generates serial data stream 218. Data acquisition system 216 which, together with communication sever 212, can be from a standard active sonar performance realization (ASPR) system or the like multiplexes acoustic beam data 210 and data stream 218 into serial data stream 218 which becomes the input data stream to parameter extraction processor 100. Parameter extraction processor 100 operates as described above in reference to FIGS. 3 and 4.

In operation, environmental sensors 202, navigation system 204, and sonar system 206 provide continuous serial data streams to communication server 212. Typically, communication server 212 contains multiple serial data ports for receiving the serial asynchronous data streams. Communication server 212 receives the multiple data streams and builds a single output data stream 214 which is passed to data acquisition system 216. In building data stream 214, communication server 212 formats the data received from environmental sensors 202, navigation system 204, and sonar system 206 into the format required by data acquisition system 216. Data acquisition system 216 receives acoustic beam data 210 and data stream 214 from communication server 212 and multiplexes the data to form a single serial data stream 218. Output data stream 218 is formatted for output to a magnetic tape data storage means (not shown) and is also passed to data conversion and synchronization unit 110 of processor 100. (More details on the formats of data stream 214 of communication server 212 and data stream 218 from data acquisition system 216 are given in *Acoustic Data Recorder Specification,* Naval Underwater Systems Center report, Dec. 18, 1989 incorporated herein by reference and in *Interface Design Documentation for the ASPR Data Acquisition System,* Naval Undersea Warfare Center Report, Jul. 31, 1992 incorporated herein by reference.)

What has thus been described is a novel processor and system for the extraction of ocean bottom parameters in real-time which offer several significant advantages over prior art methods. First, the processor and system provide an accurate way to determine bottom loss and bottom scattering coefficient values in real-time. Second, the present invention provides a processor to extract values for bottom loss and bottom scattering coefficient in real-time by processing measured reverberation and time correlated sonar, navigational, and environmental data.

Obviously many modifications and variations of the present invention may become apparent in light of the above teachings. In light of the above, it is therefore understood that within the scope of the appended claims, the invention may be practiced otherwise than as specifically described.

What is claimed is:

1. A processor for characterizing ocean bottom parameters in real-time comprising:

signal processing means for receiving navigational, environmental, and sonar data and processing said data into a reverberation energy envelope, said reverberation energy envelope being generated from an acoustic return from a sonar ping, and into blocks of time correlated data;

data monitoring means, coupled to said signal processing means, for monitoring said navigational, environmental, and sonar state data and said reverberation energy envelope for changes; and model processing means, responsive to said data monitoring means, for building a set of acoustic model eigenrays, building a reference reverberation model, said reference reverberation model comprising reference reverberation as a function of time, and extracting bottom parameters by comparing said reverberation energy envelope with said reference reverberation model.

2. The processor of claim 1 wherein said model processing means comprises:

model generating means for generating said set of acoustic model eigenrays and said reference reverberation model;

probe pulse extraction means for determining individual reverberation values for a number of acoustic paths, said paths being selected from said set of acoustic model eigenrays, and for comparing said individual reverberation values with said reverberation energy envelope to extract bottom parameters; and decay extraction means for identifying a time period wherein said reverberation energy envelope exhibits a characteristic decay rate and for analyzing said reference reverberation and said reverberation energy envelope within said time period to extract bottom parameters.

3. The processor of claim 2 wherein said data monitoring means comprises:

signal processor managing means for controlling the time correlation of said navigational, environmental, and sonar data, for managing the processing of said reverberation energy envelope, and for directing transfer of said data and said reverberation energy envelope between said data monitoring means and said signal processing means;

reverberation post processing means for analyzing two or more reverberation energy envelopes to identify changes within said reverberation energy envelopes caused by a change in said navigational, environmental, and sonar data; and system managing means for monitoring said reverberation post processing means and for managing communication with said model processing means.

4. The processor of claim 3 wherein said signal processing means comprises:

signal conditioning means for receiving said navigational, environmental, and sonar data, time correlating said navigational, environmental, and sonar data, and separating said sonar data into acoustic beam data and sonar state data; and reverberation processing means for processing said acoustic beam data into said reverberation energy envelope.

5. A system for characterizing ocean bottom parameters in real-time comprising:

sensing means for obtaining navigational and environmental data including position coordinates, heading, speed, wind direction and velocity, and water temperature a depth data;

a sonar system producing sonar state data corresponding to the configuration of said sonar system and acoustic beam data corresponding to sound received at a sonar array;

data acquisition means for producing a data stream, said data stream comprising said navigational, environmental and sonar state data multiplexed with said acoustic beam data;

signal processing means for receiving said data stream, processing said acoustic beam data into a reverberation energy envelope, said reverberation energy envelope being generated from an acoustic return from a sonar ping, and correlating said navigational, environmental, and sonar state data with said reverberation energy envelope over a common time domain;

data monitoring means, coupled to said signal processing means, for monitoring said navigational, environmental and sonar state data and said reverberation energy envelope for changes; and model processing means, responsive to said data monitoring means, for building a set of acoustic model eigenray, building a reference reverberation model, said reference reverberation mode, comprising reference reverberation as a function of time, and extracting bottom parameters by comparing said reverberation energy envelope with said reference reverberation model.

6. The system of claim 5 wherein said model processing means comprises:

model generating means for generating said set of acoustic model eigenrays and said reference reverberation model;

probe pulse extraction means for determining individual reverberation values for a number of acoustic paths, said paths being selected from said set of acoustic model eigenrays, and for comparing said individual reverberation values with said reverberation energy envelope to extract bottom parameters; and decay extraction means for identifying a time period wherein said reverberation energy envelope exhibits a characteristic decay rate and for analyzing said reference reverberation and said reverberation energy envelope within said time period to extract bottom parameters.

7. The system of claim 6 wherein said data monitoring means comprises:

signal processor managing means for controlling the time correlation of said navigational, environmental, and sonar state data with said reverberation energy envelope, for managing the processing of said reverberation energy envelope, and for directing transfer of said data and said reverberation energy envelope between said data monitoring means and said signal processing means;

reverberation post processing means for analyzing two or more reverberation energy envelopes to identify changes within said reverberation energy envelopes caused by a change in said navigational, environmental, and sonar state data; and system managing means for monitoring said reverberation post processing means and for managing communication with said model processing means.

8. The system of claim 7 wherein said signal processing means comprises:

signal conditioning means for receiving said navigational, environmental, and sonar state data, time correlating said navigational, environmental, and sonar data, and separating said sonar data into acoustic beam data and sonar state data; and reverberation processing means for processing said acoustic beam data into said reverberation energy envelope.

* * * * *